United States Patent
Rausch et al.

(10) Patent No.: US 9,975,582 B2
(45) Date of Patent: May 22, 2018

(54) SYSTEM AND OPERATING METHOD FOR LEVEL REGULATION OF A DRIVER'S CAB OF A COMMERCIAL VEHICLE RELATIVE TO THE CHASSIS OF THE VEHICLE

(71) Applicant: MAN Truck & Bus AG, Munich (DE)

(72) Inventors: Ludwig Rausch, Munich (DE); Urs Gunzert, Hebertshausen (DE); Jan Fleischhacker, Munich (DE)

(73) Assignee: MAN TRUCK & BUS AG, München (DE)

( * ) Notice: Subject to any disclaimer, the term of this patent is extended or adjusted under 35 U.S.C. 154(b) by 184 days.

(21) Appl. No.: 14/278,455

(22) Filed: May 15, 2014

(65) Prior Publication Data

US 2014/0358380 A1 Dec. 4, 2014

(30) Foreign Application Priority Data

May 31, 2013 (DE) ........................ 10 2013 009 204

(51) Int. Cl.
*B62D 33/073* (2006.01)
*B60G 17/015* (2006.01)
(Continued)

(52) U.S. Cl.
CPC ......... *B62D 33/073* (2013.01); *B60G 17/016* (2013.01); *B60G 17/0155* (2013.01);
(Continued)

(58) Field of Classification Search
CPC .............. B62D 33/073; B62D 33/0608; B60G 17/0155; B60G 17/016; B60G 17/0165;
(Continued)

(56) References Cited

U.S. PATENT DOCUMENTS 4,871,189 A * 10/1989 Van Breemen ........ B60G 11/30
180/89.12
5,033,770 A * 7/1991 Kamimura ........... B60G 17/016
280/5.507
(Continued)

FOREIGN PATENT DOCUMENTS

CN 202186439 U 4/2012
CN 202368692 U 8/2012
(Continued)

OTHER PUBLICATIONS

Graf et al., DE102011120428, Jun. 28, 2012 (Machine Translation).*
Kohata et al., JPH07156838, Jun. 20, 1995 (Machine Translation).*

*Primary Examiner* — Courtney D Heinle
(74) *Attorney, Agent, or Firm* — Lucas & Mercanti, LLP

(57) ABSTRACT

A system for level regulation of a driver's cab of a commercial vehicle relative to a chassis of the vehicle includes a spring-loaded bearing in order to support the driver's cab in a sprung manner on the chassis of the vehicle; a distance sensor device arranged to record relative movements and/or a distance between the driver's cab and the chassis of the vehicle; and a control device that is arranged for variable control of the spring-loaded bearing, wherein signals of the distance sensor device are used to control the spring-loaded bearing. The spring-loaded bearing can be adjusted to a first height position (h1), so that the distance between the driver's cab and the chassis of the vehicle is controlled by the control device to a first target distance. The spring-loaded bearing can be adjusted to at least one second height position (h2), so that the distance between the driver's cab and the chassis of the vehicle is controlled by the control means to a second target distance. The control means device adjusts the spring-loaded bearing to the first height position (h1) or to the at
(Continued)

least one second height position (h2) depending at least on a parameter relating to a driving route and/or a vehicle state.

11 Claims, 4 Drawing Sheets

(51) Int. Cl.
  *B60G 17/016*  (2006.01)
  *B60G 17/0165* (2006.01)
  *B60G 17/052*  (2006.01)
  *B62D 33/06*   (2006.01)

(52) U.S. Cl.
  CPC ..... *B60G 17/0165* (2013.01); *B60G 17/0523* (2013.01); *B62D 33/0608* (2013.01); *B60G 2202/152* (2013.01); *B60G 2204/162* (2013.01); *B60G 2300/02* (2013.01); *B60G 2300/14* (2013.01); *B60G 2400/104* (2013.01); *B60G 2400/106* (2013.01); *B60G 2400/204* (2013.01); *B60G 2400/252* (2013.01); *B60G 2400/412* (2013.01); *B60G 2400/821* (2013.01); *B60G 2401/16* (2013.01); *B60G 2500/204* (2013.01); *B60G 2600/02* (2013.01); *B60G 2800/162* (2013.01); *B60G 2800/914* (2013.01)

(58) Field of Classification Search
  CPC .......... B60G 17/0523; B60G 2202/152; B60G 2204/162; B60G 2300/02; B60G 2300/14; B60G 2400/104; B60G 2400/106; B60G 2400/204; B60G 2400/252; B60G 2400/412; B60G 2400/821; B60G 2401/16; B60G 2500/204; B60G 2600/02; B60G 2800/162; B60G 2800/914
  See application file for complete search history.

(56) References Cited

U.S. PATENT DOCUMENTS

| | | | | |
|---|---|---|---|---|
| 5,044,660 | A * | 9/1991 | Yamamura | B60G 17/0162 267/64.16 |
| 5,083,275 | A | 1/1992 | Kawagoe | |
| 5,144,558 | A * | 9/1992 | Fukushima | B60G 17/016 280/5.506 |
| 5,209,316 | A * | 5/1993 | Bauer | B62D 33/07 180/89.14 |
| 5,347,457 | A * | 9/1994 | Tanaka | B60G 17/0164 280/5.514 |
| 5,899,288 | A * | 5/1999 | Schubert | F16F 15/027 180/89.12 |
| 5,941,920 | A * | 8/1999 | Schubert | B62D 33/0608 180/89.13 |
| 6,000,702 | A * | 12/1999 | Streiter | B60G 17/016 280/5.507 |
| 6,000,703 | A * | 12/1999 | Schubert | B60G 17/0165 180/89.12 |
| 6,029,764 | A * | 2/2000 | Schubert | B62D 33/0608 180/89.12 |
| 6,070,681 | A * | 6/2000 | Catanzarite | B62D 33/0608 180/89.15 |
| 6,161,845 | A * | 12/2000 | Shono | B60G 17/0152 280/5.514 |
| 6,164,665 | A * | 12/2000 | Lentz | B60G 17/015 280/124.157 |
| 6,282,470 | B1 * | 8/2001 | Shono | B60G 17/015 180/41 |
| 6,830,256 | B2 * | 12/2004 | Bryant | B60G 15/06 267/194 |
| 6,959,932 | B2 * | 11/2005 | Svartz | B60G 9/003 280/124.157 |
| 7,729,829 | B2 * | 6/2010 | Messih | B60T 8/172 180/282 |
| 2001/0044685 | A1 * | 11/2001 | Schubert | B60G 17/0165 701/50 |
| 2002/0045977 | A1 * | 4/2002 | Uchiyama | B60G 17/015 701/37 |
| 2004/0104061 | A1 * | 6/2004 | Oliver | B62D 33/0608 180/89.12 |
| 2004/0129468 | A1 * | 7/2004 | Oliver | F16F 15/0275 180/89.12 |
| 2004/0227050 | A1 * | 11/2004 | Haller | B60N 2/1665 248/566 |
| 2005/0113998 | A1 * | 5/2005 | Kim | B60G 17/018 701/37 |
| 2006/0047387 | A1 * | 3/2006 | Izawa | B60G 17/0182 701/37 |
| 2006/0091635 | A1 * | 5/2006 | Cook | B60G 3/06 280/124.106 |
| 2006/0255623 | A1 | 11/2006 | Haller | |
| 2006/0267296 | A1 * | 11/2006 | Dodd | B60G 11/27 280/5.512 |
| 2007/0073461 | A1 * | 3/2007 | Fielder | B60G 17/015 701/37 |
| 2007/0129865 | A1 * | 6/2007 | Kim, II | B60G 17/0185 701/37 |
| 2009/0097038 | A1 * | 4/2009 | Higgins-Luthman | B60G 17/019 356/602 |
| 2009/0134595 | A1 * | 5/2009 | Haller | B60G 17/0155 280/124.157 |
| 2009/0248247 | A1 * | 10/2009 | Furuichi | B60G 17/016 701/37 |
| 2010/0152969 | A1 * | 6/2010 | Li | B60G 17/0165 701/37 |

FOREIGN PATENT DOCUMENTS

| | | |
|---|---|---|
| DE | 32 23 140 A1 | 12/1983 |
| DE | 33 28 497 A1 | 2/1985 |
| DE | 198 11 809 A1 | 9/1999 |
| DE | 10 2011 120 428 A1 | 6/2012 |
| DE | 10 2011 122 386 A1 | 6/2013 |
| EP | 0089794 A2 | 9/1983 |
| EP | 1584545 A2 | 10/2005 |
| EP | 1724131 A1 | 11/2006 |
| JP | H06286649 A | 10/1994 |
| JP | H07156838 A | 6/1995 |
| JP | 2013100029 A | 5/2013 |

* cited by examiner

SYSTEM AND OPERATING METHOD FOR LEVEL REGULATION OF A DRIVER'S CAB OF A COMMERCIAL VEHICLE RELATIVE TO THE CHASSIS OF THE VEHICLE

CROSS-REFERENCE TO RELATED APPLICATIONS

This application claims the priority of DE 10 2013 009 204.3 filed May 31, 2014, which is incorporated by reference herein.

BACKGROUND OF THE INVENTION

The invention relates to a system for level regulation of a driver's cab of a commercial vehicle relative to the chassis of the vehicle. The invention also relates to an operating method for level regulation of a driver's cab of a commercial vehicle relative to the chassis of the vehicle.

Spring or damping mechanisms are known from the prior art for sprung mounting of the driver's cab of a commercial vehicle on the chassis of the vehicle. The driver of the commercial vehicle can thereby be better protected against vibrations caused by the highway, e.g. by undulations or potholes. In order to achieve a good damping effect and a high level of damping comfort, even in the event of strong vibrations caused by the highway, a very long spring travel is desirable. However, a long spring travel causes a large gap between the driver's cab and the chassis as well as a correspondingly greater structural height of the commercial vehicle. This degrades the $c_w$ value (i.e. drag coefficient) and hence the fuel consumption of the commercial vehicle. Such systems are thus insufficiently suitable to enable both a high level of ride comfort and also efficient fuel consumption and to adapt the spring system or damping system to the diverse traffic and driving situations occurring in real road traffic.

With a spring or damping mechanism known from the prior art, air struts are used that are self-levelling by means of an internal or external lever system and valves and in this way adjust a fixed distance that cannot be influenced between the driver's cab and the chassis of the vehicle. With said spring mechanism, if the driver's cab moves relative to the chassis because of excitations from the ground or other influences, a valve is operated by an internal lever or a lever attached to the spring strut, so that with movements of the spring strut air is permanently discharged into the surroundings or air is pumped into the spring strut once the target position is left. The high consumption of air resulting from the continuous air input and discharge is disadvantageous with this spring mechanism.

SUMMARY OF THE INVENTION

It is an object of the invention to provide a driver's cab suspension system of a commercial vehicle that both comprises a high level of damping comfort and also enables efficient operation of the motor vehicle.

According to the present invention, the system for level regulation of a driver's cab of a commercial vehicle relative to a chassis of the vehicle comprises a spring-loaded bearing in order to support the driver's cab in a sprung manner on the chassis of the vehicle, as well as a distance sensor means that is arranged to record relative movements and/ora distance between the driver's cab and the chassis of the vehicle. The driver's cab is the part of the structure of the vehicle that forms the space for the driver of the vehicle and accompanying persons. The chassis of the vehicle is also referred to below as the chassis.

The system comprises a control means that is arranged for variable control of the spring-loaded bearing, wherein signals of the distance sensor means are used to control the spring-loaded bearing. Furthermore, the spring-loaded bearing can be adjusted to a first height position, so that the distance between the driver's cab and the chassis of the vehicle is controlled by the control means to a first target distance.

For this purpose the control means is arranged to detect, using the received signals of the distance sensor means, whether a deviation of the distance between the driver's cab and the chassis from the target distance or from the null position, e.g. resulting from road surface unevenness, is returned to the target distance or the null position. If the control means detects a permanent deviation from the target position or one that is not caused by the normal spring movement, the control means can intervene in a regulating manner to restore the target distance. In a comparable manner, a deviation from the parallel orientation of the driver's cab relative to the chassis, e.g. resulting from the weight of a driver, whereby the driver's cab lowers slightly at one point, can be recorded by the distance sensor means and suitably corrected by controlling the spring-loaded bearing. According to the present invention, the spring-loaded bearing is additionally or alternatively adjustable to at least one second height position, so that the distance between the driver's cab and the chassis of the vehicle is controlled by the control means to a second target distance. In other words, the spring-loaded bearing is adjustable in height to at least two specified height positions. An altered height position of the spring-loaded bearing changes the (target) distance between the driver's cab and the chassis and hence the predetermined null position around which the driver's cab can be spring-loaded relative to the chassis.

The spring-loaded bearing is hereby adjusted by the control means to the first or to the at least one second height position, depending on at least one parameter relating to a driving route and/or a driving state of the commercial vehicle. A particular advantage of the invention is that the suspension of the driver's cab can be adapted to the actual driving circumstances in order to select the height position of the spring-loaded bearing depending on the driving situation that enables the best possible compromise of required suspension comfort and low fuel consumption.

An example of a parameter relating to the driving route can be the actual type of road, so that the height position of the spring-loaded bearing can be altered depending on whether the vehicle is currently travelling e.g. on a motorway or highway, a country road, or an unpaved road. This has the advantage that for types of road on which road unevenness, potholes etc. are increasingly to be expected, the spring-loaded bearing can be adjusted to the greater height position in order thereby to increase the spring travel and enhance the suspension comfort.

If by contrast the current type of road is recognised e.g. as a motorway or highway, with which the quality of the road surface is generally better, the spring-loaded bearing can be lowered to a lower height position, so that the distance between the driver's cab and the chassis is adjusted to a smaller target height. For types of road with good road surfaces, the spring length can be reduced without loss of comfort in order to reduce the gap between the driver's cab and the chassis to improve the $c_w$ value (i.e. drag coefficient) of the vehicle.

An example of a parameter relating to the driving state of the commercial vehicle, which is used for adjusting the height position of the spring-loaded bearing, is the current speed of travel. The control means is preferably arranged to adjust a greater height position with a longer spring travel at vehicle speeds below a predetermined threshold value and on exceeding the threshold value to cause a lowering to the lower height position and to adjust the spring-loaded bearing to a correspondingly smaller target distance. According to experience, the speed of travel of the commercial vehicle is low if strong vibrations or excitations from the ground are to be expected. Especially at high vehicle speeds, a shorter distance between the driver's cab and the chassis has a disproportionately large effect on the fuel efficiency of the vehicle.

The steering activity of the driver is another example of a possible parameter, based on which it can be decided whether the spring-loaded position is adjusted to a first height position or at least one second height position. Other possible variables from which it can be determined whether the suspension demand resulting from the current driving circumstances is to be currently raised or lowered are the lateral acceleration, the longitudinal acceleration or a vertical acceleration of the commercial vehicle, which can be recorded by means of suitable sensors.

According to another advantageous embodiment, the movement of the driver's cab can also be directly measured, e.g. by using the distance sensor means. If the movement of the driver's cab exceeds a predetermined threshold value, this can be interpreted as a measure of an increased suspension demand, so that in this situation the spring-loaded bearing is adjusted to a height position with a longer spring travel and larger target distance between the driver's cab and the chassis.

Using such parameters it can e.g. be determined by using corresponding experimentally determined test data when a changeover to an altered height position of the suspension is advantageous. The invention is, however, not restricted to the use of the abovementioned parameters, such as the speed of travel, the type of road or the lateral acceleration. Thus other parameters can be alternatively or additionally used, from which it can be determined whether the suspension demand is currently to be increased or reduced because of the current driving circumstances in order to reduce the height position with reduced suspension demand to improve fuel efficiency.

Preferably, the recorded values of the abovementioned parameters that have continuous values are integrated over a predetermined time interval and it is then determined whether the integrated value exceeds a predetermined threshold value, in order to enable a more reliable indication of the current suspension demand to be derived.

The system for level regulation of the driver's cab can be designed such that the spring-loaded bearing can only be adjusted to two different height positions, enabling changeovers between a "comfort position" with a greater suspension height and large target distance between the driver's cab and the chassis and an "aerodynamic position" with shorter spring travel and smaller target distance between the driver's cab and the chassis. This enables a situationally adaptive change of the suspension properties of the commercial vehicle with efficient costs.

With another advantageous embodiment, the spring-loaded bearing can be adjusted to a plurality of different height positions, wherein each height position corresponds to a predetermined target distance between the driver's cab and the chassis, wherein the control means regulates to maintain said target distance after the height position has been adjusted. It is moreover possible to provide a system for level regulation with which continuous adjustment of the height position of the spring-loaded bearing is possible. This has the advantage that the drivers cab suspension can be adjusted more flexibly to the current driving circumstances in order to select the height position of the spring-loaded bearing depending on the driving situation, which enables the best possible compromise of the required suspension comfort and low fuel consumption.

Another advantage of the invention is that a "sluggish" regulation to the target distance of the adjusted height position takes place in order to avoid permanent air input and air discharge for each movement of the spring elements from the target position. Preferably, the spring-loaded bearing comprises for this purpose a plurality of pneumatic and/or hydraulic spring elements, a central valve block for variable supply of the spring elements with a pressure-generating medium and a supply unit that supplies the valve block with the pressure-generating medium. According to this embodiment, the control means is designed as a central control unit. The central control unit is arranged to determine whether the target position is readjusted with a spring element following a deviation from the target position by means of normal "spring compression". If not, this is detected after a predetermined time by analysis by the control unit of the signals of the distance sensor means. The control means can then regulate the pressure level of said spring element by controlling the central valve block such that said spring element is again compressed to the adjusted target distance.

The "sluggish" regulation can also be achieved if, instead of a central control unit as the control means and instead of a central valve block on the spring elements, a valve and a regulator element are respectively provided. The individual regulators receive the at least one parameter relating to a driving route and/or a driving state of the commercial vehicle, in order to potentially alter the height position of the spring-loaded bearing. Furthermore, the regulators receive, by means of the signals of a distance sensor, a deviation, which is to be corrected, from the current target position of the respective spring element.

The regulators control the level of the pressure medium of the spring element by means of the valve in order to regulate the same to the target height position or to the target distance.

Preferably, the distance sensor means comprises distance sensors, e.g. displacement transducers, each of which measures the spring movement and orientation of the individual spring elements between the driver's cab and the chassis. Preferably, the spring-loaded bearing comprises compressed air operated spring struts, e.g. four spring struts being provided for spring-loaded suspension of the driver's cab on the chassis.

If four spring struts are provided for suspension of the driver's cab on the chassis, displacement transducers can be provided on each or only on three of the spring struts. Three measuring points of three distance sensors define a plane and hence the orientation of the driver's cab relative to the chassis. In this way a fourth distance sensor can be dispensed with.

Furthermore, the control means can be arranged to regulate the distance between the driver's cab and the chassis of the vehicle back to the previous height position after again reaching a changeover condition, e.g. after falling below a previously exceeded threshold value. Preferably, however, control back to the first or the previous height position only takes place if a predetermined delay time has elapsed after the previous changeover. This enables prevention of changing back and forth of the height position of the spring-loaded bearing and of the distance between the driver's cab and the chassis, which occurs with fluctuations of a parameter about the changeover condition, e.g. the fluctuation of the speed of travel about a predetermined limit value.

The invention also recognises an operating method for the level regulation of a driver's cab of a commercial vehicle relative to a chassis of the vehicle, comprising the steps: recording a relative movement and/or a distance between the driver's cab and the chassis of the vehicle; adjusting a spring-loaded bearing, which supports the driver's cab in a sprung manner on the chassis of the vehicle, to a first height position and controlling the distance between the driver's cab and the chassis of the vehicle to at least one first target distance, wherein the recorded relative movement and/or the distance between the driver's cab and the chassis of the vehicle is/are used to control the spring-loaded bearing to the first target distance. Furthermore, the operating method comprises the adjustment of the spring-loaded bearing to at least one second height position and regulation of the distance between the driver's cab and the chassis of the vehicle to at least one second target distance, wherein the recorded relative movement and/or the distance between the driver's cab and the chassis of the vehicle is/are used to control the spring-loaded bearing to the second target distance. The adjustment of the spring-loaded bearing to the first or to the at least one second height position takes place here depending at least on a parameter relating to a driving route and/or a driving state of the commercial vehicle. The previously described aspects of the system also apply to the operating method according to the invention and can be combined therewith without this being explicitly presented again.

BRIEF DESCRIPTION OF THE DRAWINGS

Preferred embodiments of the present invention are described in detail below, for example and by way of example with reference to the accompanying figures.

DETAILED DESCRIPTION OF THE PREFERRED EMBODIMENTS

Figure 1:
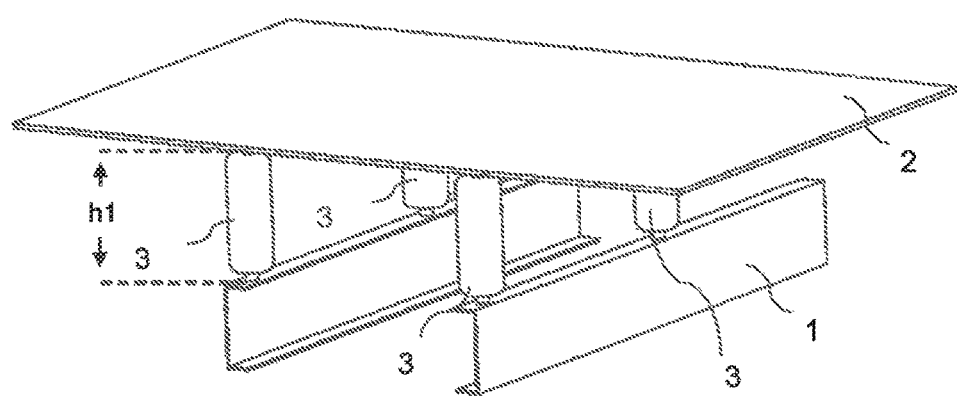
FIG. 1 illustrates by way of example a spring-loaded bearing of a driver's cab on a chassis of the vehicle in a first height position.
Figure 2:
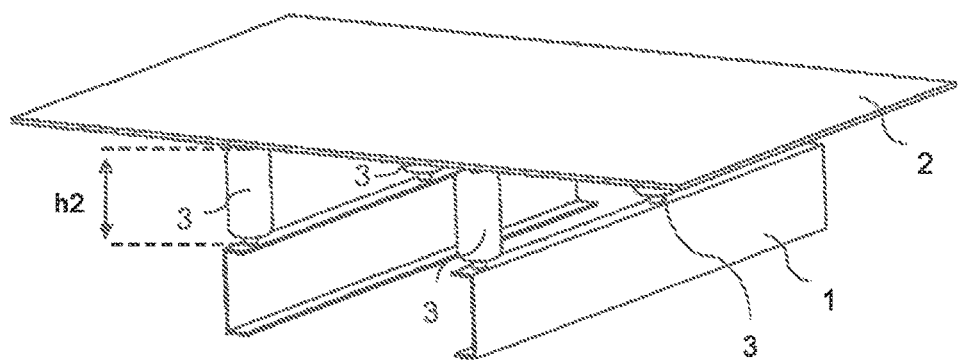
FIG. 2 shows the suspension from FIG. 1 in a second height position.

FIG. 1 and FIG. 2 illustrate a spring-loaded bearing of a driver's cab 2 (shown simplified as a planar plate) on a chassis of the vehicle 1 (shown simplified as two parallel disposed profile supports). The driver's cab 2 is supported on the chassis 1 in a sprung manner by means of four spring elements 3 operated with compressed air in a parallel orientation.

The spring elements 3 are height adjustable. In the present exemplary embodiment, the spring elements 3 can be adjusted to two specified height positions h1 and h2, wherein the height position h1 is greater than the height position h2, which can be seen by comparison of FIG. 1 with FIG. 2. An altered height position h1; h2 of the spring-loaded bearing changes the (target) distance between the driver's cab (2) and the chassis (1) and hence the predetermined null position, about which the driver's cab (2) can be sprung relative to the chassis (1) for vertical excitations. The smaller height position h2 of the spring-loaded bearing in FIG. 2 reduces the available spring travel. This does reduce the suspension comfort, but also reduces the gap or the distance between the chassis (1) and the driver's cab (2).

In comparison to the "comfort position" shown in FIG. 1 with a greater height position h1 of the springs 3, the "aerodynamic position" illustrated in FIG. 2 enables better aerodynamic properties of the vehicle by means of the reduced gap or distance between the driver's cab (2) and the chassis (1), and thus reduced fuel consumption.

Figure 3:
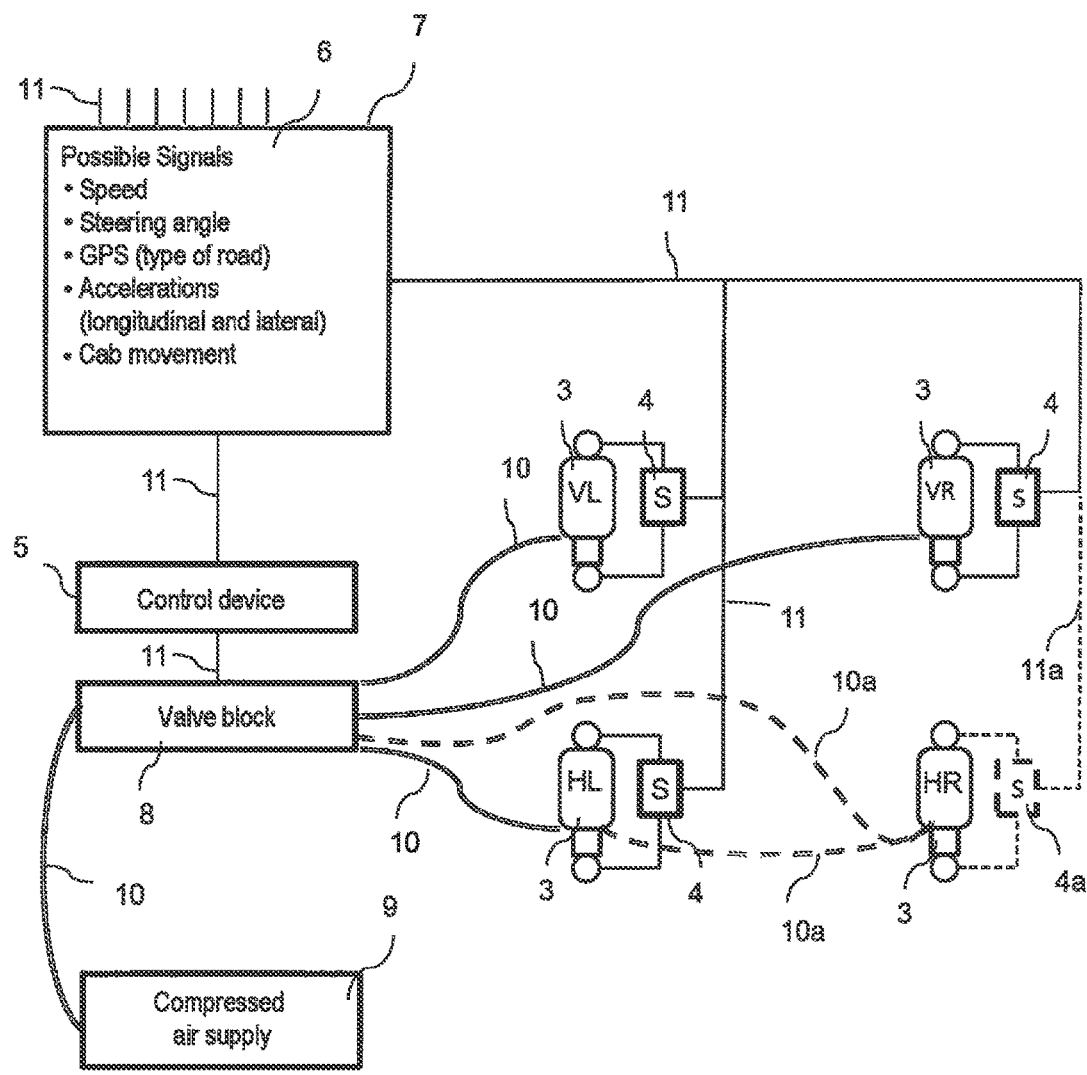
FIG. 3 shows a schematic block diagram of a system for level regulation of a driver's cab according to an exemplary embodiment.

FIG. 3 shows a schematic block diagram for illustration of an exemplary embodiment of the present invention.

The spring elements 3 shown in FIG. 1 are illustrated in FIG. 3 as four spring struts 3, by means of which the driver's cab (2; not shown) is supported in a sprung manner on the chassis (1; not shown), wherein there is a spring strut 3 disposed at each of the front left (VL), front right (VR), rear left (HL) and rear right (HR) lower end regions of the driver's cab (2).

The spring struts 3 can be adjusted to two specified height positions h1, h2. A displacement transducer 4 disposed on three of the spring struts 3 measures the changes in length or the deviations of the springs 3 from the null position. The measurement data determined by the displacement transducers 4 are transmitted by means of a signal line 11 to a central recording unit 7.

The receiving unit 7 also receives by means of signal lines 11 the measurement values of one or a plurality of parameters 6 relating to the current driving route and/or a driving state of the vehicle. Possible signals that are collected in the receiving unit 7 are listed in FIG. 3 only by way of example. These include the current speed of travel of the vehicle, the current steering angle, GPS data, using which the type of road can be determined, acceleration data that are e.g. determined by means of sensors for recording the longitudinal acceleration and lateral acceleration or measurement data regarding the cab movements.

The parameter data 6 are transmitted to a central control unit 5 which analyses the received parameter values 6.

The central control unit 5 is, furthermore, connected by means of a signal line 11 to a central valve block 8 for controlling the valve block 8. The valve block 8 is supplied by means of a pressure line 10 with compressed air from a compressed air supply unit 9. The valve block 8 is directly connected to at least three of the spring struts 3 by means of a compressed air line 10 in order to regulate the compressed air level in said spring struts 3 as determined by the control unit 5.

The rear right spring strut 3 is optionally supplied by means of a separate compressed air line 10 directly from the valve block 8 or can alternatively also be controlled only indirectly by means of the compressed air line 10a, which supplies both the rear left and also the rear right spring strut 3 (illustrated by the dashed compressed air lines 10a). The latter enables less accurate compensation of deviations from the target distance of the rear left and rear right spring struts, but is less expensive to implement and leads to sufficiently good results in practice.

The control unit 5 combines two different regulating modes. A first regulating mode analyses the parameters 6 transmitted to the control unit 5 and relating to the driving route and/or the driving state of the vehicle. The control unit 5 additionally determines or stores the current height position h1; h2 of the spring elements 3. The parameter values 6 relating to the driving route and/or the driving state determine, by using predetermined associations or threshold values, whether the first (h1) or the second (h2) height position of the spring-loaded bearing is adjusted. If e.g. the speed of travel exceeds a predetermined threshold value, then the spring struts 3 are adjusted from their first height position h1 to the second height position h2 (cf. FIG. 1 for this), if the spring struts 3 are currently adjusted to the first height position h1.

For this purpose the central control unit 5 controls the valve block 8 by means of a signal line 11, so that the valve block adjusts the height position h1; h2 of the spring struts 8 to the altered height position h1; h2 by means of the pressure lines 10. If the control unit 5 determines that the speed of travel has again decreased below the threshold value, then the control unit 5 controls the central valve block 8 such that the spring struts 3 are again adjusted back to the first height position h1. It is hereby checked in advance whether a predetermined delay time following the last height change of the spring struts 3 has elapsed, in order to prevent continual switching back and forth if the speed of travel is fluctuating about the predetermined threshold value.

A second regulating mode then occurs both at the first height position h1 and also at the second height position h2 of the spring struts 3. In said second regulating mode the control unit 5 monitors, by means of the received output signals of the displacement transducer 4, whether the driver's cab 2 is oriented parallel to the chassis 1 and whether the specified target distance for the respective height position h1, h2 is maintained.

If e.g. the front left spring strut 3 is compressed by the weight of a driver, this is recorded by the displacement transducer 4 that is disposed on the front left spring strut 3 by means of a reduction of the distance between the driver's cab 2 and the chassis 1.

Thereupon the control unit 5 detects, by comparison of the measured values of the displacement transducers 4 of the individual spring struts 3, that a slight misalignment of the driver's cab 2 relative to the chassis 1 has arisen. Consequently, the control unit 5 controls the valve block 11 such that the valve block corrects the height of the front left spring strut 3 back to the target distance of the currently adjusted spring height by means of the pressure line 10 leading from the valve block 11 to the front left spring strut 3.

The control unit 5 is further arranged to check at regular intervals whether the specified target distance for the current height position h1; h2 for the spring struts 2 is maintained at all spring struts 3 or whether "normal" spring movements about the specified target distance are carried out. "Normal" spring movements about the specified target distance occur continuously when driving as a result of potholes, undulations or poor roads etc.

Such deviations from the target state are normally reduced by the spring mechanism of the spring struts 3 by themselves by the stimulated spring strut 3 settling back into the null position. If this is not the case for one or more spring struts 3, however, this will be recorded by the control unit 5 by means of the received signals of the displacement transducer 4 and compensated in turn by suitable control of the valve block 8, which raises or lowers the corresponding compressed air level in the spring struts 3 involved as required.

With said second "sluggish" regulating mechanism, not every deviation from the target position will be directly counteracted by inputting or discharging compressed air, hut "rebounding" will be enabled by provision of the control means 5; 13 and it will be corrected back to the target distance only if required. This enables more efficient compressed air control. Said second regulating mechanism is overlaid on the first regulating mechanism for adjustment of the spring height.

FIG. 3 illustrates another variant of an exemplary embodiment, with which, illustrated by the dashed lines, a fourth displacement transducer 4a is additionally disposed on the rear right spring strut 3. Its measurement signals are in turn transmitted by means of a data line 11a via the receiving unit 7 to the control unit 5 and analysed there.

Figure 4:
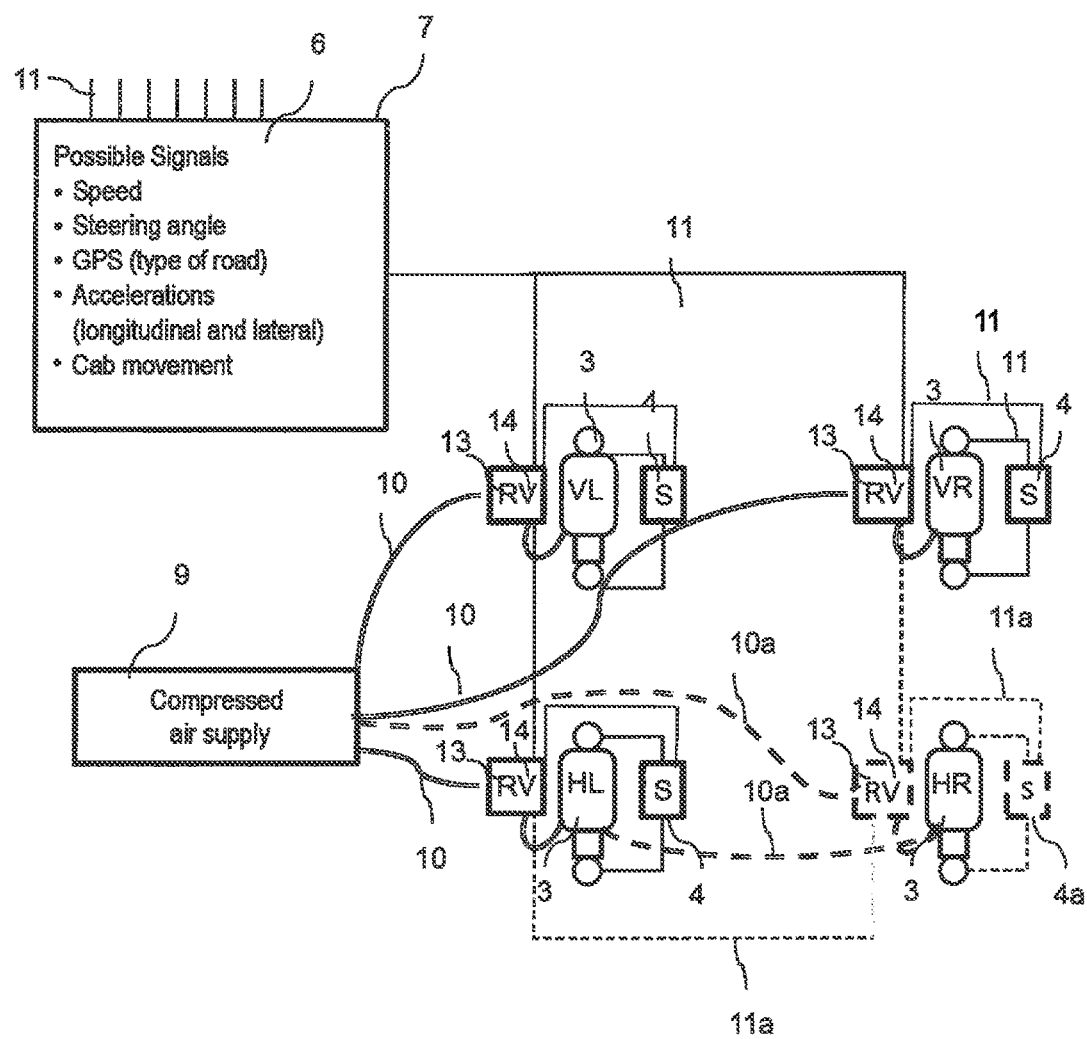
FIG. 4 shows a schematic block diagram of a system for level regulation of a driver's cab according to another exemplary embodiment.

FIG. 4 shows another exemplary embodiment, which differs from the exemplary embodiment described in FIG. 3 essentially in that instead of a central control unit 5, distributed regulator 13/valve 14 combinations are disposed on each of the two front (VL, VR) spring struts 3 and one of the rear (HL) spring struts 3, whereby a central valve block 8 can be omitted.

The regulator valve combinations 13, 14 are supplied by means of hose lines 10 with compressed air from a compressed air supply unit 9. The regulators 13 receive the previously described signals 6 relating to the driving route or the driving state of the commercial vehicle and the signals of the displacement transducer 4, which carries out the distance measurement on the spring strut 3 of the regulator 13.

The regulator 13 directly controls a valve 14 on the respective spring strut 3 on the basis of the received signals in order to supply the displacement transducer 4 with compressed air or to discharge compressed air out of the displacement transducer 4. By this means the two different regulating modes can be separately implemented for a spring strut 3 by each of the regulators 13 as previously described: if the analysis of the parameter 6 by the individual regulators 13 indicates that a different height position h1; h2 of the spring struts 3 is to be adjusted, the new height position h1; h2 of the spring struts 3 is adjusted by controlling the valves 14. This is generally performed by all regulators 13 at the same point in time in order to maintain parallel orientation of the driver's cab 2 relative to the chassis 1 during the distance change. Furthermore, the regulator 13 monitors the target distance of the spring struts 3 corresponding to the height position h1; h2 and corrects the spring strut 3 as required to the specified target distance height.

The rear right spring strut 3 is optionally supplied (illustrated by the dashed compressed air lines 10a) by means of a separate compressed air line 10a directly from the compressed air supply 9 or can alternatively also be controlled only indirectly by means of the compressed air line 10a, which supplies both the rear left (HL) and also the rear right (FIR) spring strut 3. With the last variant, the regulator 14 of the rear left (HL) spring strut 3 also controls the compressed air level at the rear right (FIR) spring strut 3, so that a separate regulator 14 at the rear right (FIR) spring strut 3 can be omitted.

FIG. 4 also illustrates another variant of an exemplary embodiment, with which, illustrated by the dashed lines, a fourth displacement transducer 4a is additionally disposed on the rear right (HR) spring strut 3. Its measurement signals are again transmitted by means of a data line 11a to the regulator 14 of said spring strut 3 and analysed there.

Figure 5:
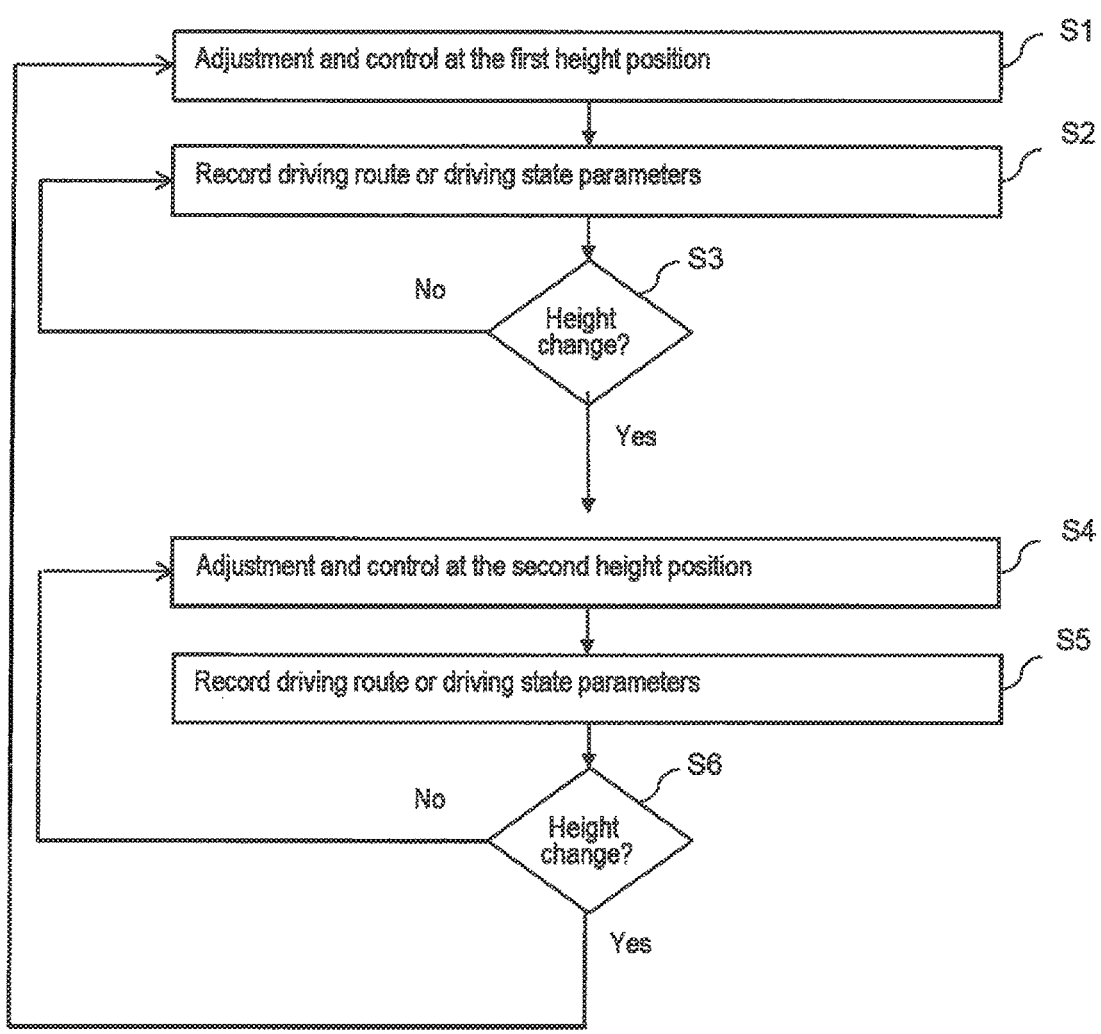
FIG. 5 shows a flow diagram for illustration of the main steps of an operating method for level regulation of a driver's cab according to an exemplary embodiment.

FIG. 5 illustrates by way of example an operating method according to an exemplary embodiment. In step S1 the spring-loaded bearing between the driver's cab 2 and the chassis 1 is adjusted to a first height position. In said first height position h1 the driver's cab 2 is at a specified first target distance from the chassis of the vehicle 1. With the previously described sluggish regulation the control means 5; 13 checks at regular intervals whether the first target distance of all spring elements 3 is maintained taking into account the normal settling and controls the individual spring elements 3 back to the specified target distance in the event of deviations.

Step S2 illustrates that the current measurement values of the parameter 6 relating to the driving route or the driving state are recorded continuously. In step S3 it is checked by analysing the parameter values 6 whether a specified threshold value or a predetermined changeover condition is reached. If NO, the parameter values 6 continue to be determined and monitored. If YES, this means that the current spring height of the spring elements 3 is to be altered. Consequently, in step S4 the spring height is adjusted to the second height position h2, so that a second target distance between the driver's cab 2 and the chassis 1 is specified. In step S5, as in step S2, the current measurement values of the parameter 6 relating to the driving route or the driving state are continuously recorded and in step S6 using the measurement values the driving state and driving route parameters 6 it is decided whether the second height position h2 of the spring elements 3 is to be maintained or whether a change is to be made back to the first height position h1, in this case the regulating loop starts anew at step S1.

The individual features of the invention are of course not restricted to the described combinations of features within the scope of the presented exemplary embodiments. This refers especially to the combinations of the parameters relating to the driving route and/or the driving state of the commercial vehicle, which depending on provided vehicle sensor systems can also be used in various combinations in order to determine a function variable, from which it can be determined whether the suspension demand resulting from the current driving circumstances is to be currently increased or reduced or whether because of the current driving situation, e.g. high speed, a reduction of the spring height to reduce the $c_w$ value is particularly advantageous.

REFERENCE CHARACTER LIST 1 chassis of the vehicle
2 driver's cab
3 spring, spring strut
4, 4a displacement transducer
5 control unit
6 parameter relating to a driving route and/or a driving state of the commercial vehicle
7 recording unit
8 valve block
9 compressed air supply unit
10, 10a compressed air line
11, 11a signal line
13 regulator
14 valve
h1 first height position
h2 second height position

The invention claimed is:

1. A system for regulating a level of a driver's cab of a commercial vehicle relative to a vehicle chassis, comprising:
a spring-loaded bearing for supporting the driver's cab on the vehicle chassis, the spring-loaded bearing comprising a plurality of spring elements including pneumatic or hydraulic spring elements, each of the spring elements having a valve for variable supply of the each of the spring elements with a pressure-generating medium, and a supply unit supplying the pressure-generating medium for the spring elements;
a distance sensor configured to record at least one of relative movements and a distance between the driver's cab and the vehicle chassis;
a distributed control device with regulators disposed on the valves of the spring elements, each of the regulators independently controlling a respective one of the valves of the spring-loaded bearing based on a signal received from the distance sensor;
wherein the spring-loaded bearing is adjustable to a first height position, where a distance between the driver's cab and the vehicle chassis is controlled by the distributed control device to a first target distance, and a second height position, where a distance between the driver's cab and the vehicle chassis is controlled by the distributed control device to a second target distance that is different from the first target distance,
wherein each of the regulators of the distributed control device receives a signal indicating a measurement value of at least one parameter relating to a driving route of the commercial vehicle and adjusts the respective one of the valves to position the spring-loaded bearing to the first height position or the second height position in response to the measurement value of the at least one parameter, and
wherein, if one of the spring elements is not compressed to the adjusted target distance, one of the regulators corresponding to the one of the spring elements controls the level of the pressure medium of the one of the spring elements by the valve disposed on the one of the regulators such that the one of the spring elements is again compressed to the adjusted target distance.

2. The system according to claim 1, wherein the at least one parameter includes at least a speed of travel.

3. The system according to claim 2, wherein the distributed control device regulates the distance between the driver's cab and the vehicle chassis from the first target distance to the second target distance when the speed of travel exceeds a predetermined threshold value, and the second target distance is smaller than the first target distance and a spring travel of the spring-loaded bearing in the second height position corresponding to the second target distance is smaller than the spring travel in the first height position corresponding to the first target distance.

4. The system according to claim 1, wherein the at least one parameter includes at least one of a steering activity, a lateral acceleration, a longitudinal acceleration of the commercial vehicle, and a movement of the driver's cab.

5. The system according to claim 1, wherein the distance sensor comprises three displacement transducers and the spring-loaded bearing comprises four spring struts operated by compressed air, each one of the three displacement transducers is disposed on a respective one of the spring struts for distance measurement.

6. The system according to claim 1, wherein the at least one parameter includes a steering activity.

7. The system according to claim 1, wherein the at least one parameter includes the type of road.

8. The system according to claim 7, wherein the type of road is determined based on GPS-data.

9. The system according to claim 1, wherein the first target distance of the first height position is greater than the second target distance of the second height position, and a spring travel of the spring-loaded bearing in the first height position is greater than the spring travel in the second height position.

10. A commercial vehicle comprising the system according to claim 1.

11. An operating method for regulating a driver's cab of a commercial vehicle relative to a vehicle chassis, comprising the steps:
- recording at least one of a relative movement and a distance between the driver's cab and the vehicle chassis;
- adjusting a spring-loaded bearing that supports the driver's cab in a sprung manner on the vehicle chassis based on the recorded at least one of a relative movement and a distance between the driver's cab and the vehicle chassis, the spring-loaded bearing comprising a plurality of spring elements including pneumatic or hydraulic spring elements, each of the spring elements having a valve for variable supply of the each of the spring elements with a pressure-generating medium, and a supply unit supplying the pressure-generating medium for the spring elements,
- wherein the spring-loaded bearing is adjustable to a first height position, where a distance between the driver's cab and the vehicle chassis is controlled by a distributed control device to a first target distance, and a second height position, where a distance between the driver's cab and the vehicle chassis is controlled by the distributed control device to a second target distance that is different from the first target distance; and
- adjusting the spring-loaded bearing to the first height position or the second height position in response to a measured value of at least one parameter relating to a driving route of the commercial vehicle, the distributed control device including regulators disposed on the valves of the spring elements, each of the regulators independently controlling a respective one of the valves, the each of the regulators receiving a signal indicating the measured value of at least one parameter relating to a driving route of the commercial vehicle and adjusting the respective one of the valves to position the spring-loaded bearing to the first height position or the second height position in response to the measured value, and
- wherein, if one of the spring elements is not compressed to the adjusted target distance, one of the regulators corresponding to the one of the spring elements controls the level of the pressure medium of the one of the spring elements by the valve disposed on the one of the regulators such that the one of the spring elements is again compressed to the adjusted target distance.

* * * * *